July 11, 1972     C. A. RENNIE ET AL     3,676,297
PENTAGONAL CORE BLOCKS FOR GAS COOLED NUCLEAR REACTORS
Filed Dec. 9, 1968     4 Sheets-Sheet 1

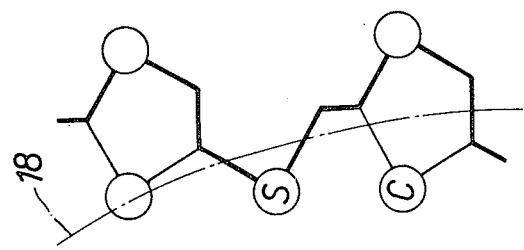
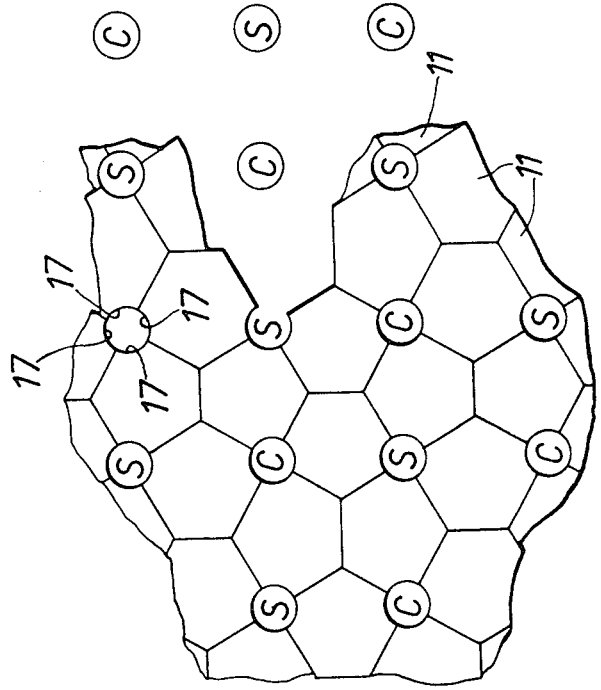
FIG.3.

United States Patent Office 3,676,297
Patented July 11, 1972

3,676,297
PENTAGONAL CORE BLOCKS FOR GAS COOLED NUCLEAR REACTORS
Compton Alexander Rennie, Wareham, George Edward Lockett, Parkstone, and Samuel Brittan Hosegood, Wareham, England, assignors to United Kingdom Atomic Energy Authority, London, England
Filed Dec. 9, 1968, Ser. No. 782,295
Claims priority, application Great Britain, Dec. 21, 1967, 58,245/67
Int. Cl. G21c *3/04, 5/14*
U.S. Cl. 176—58                3 Claims

ABSTRACT OF THE DISCLOSURE

A gas cooled reactor having a core composed of a plurality of similar replaceable fuel bearing blocks of moderator material. The blocks are substantially pentagonal in cross section and assembled side by side with the flanks of one block engaging the flanks of adjacent blocks. The blocks are interlocked due to their shape such that upon removal of a block a neighboring block will not topple into the void so created. The corners of adjacent blocks are grooved to receive longitudinal members which are withdrawable to provide looseness between the flanks of adjacent blocks.

BACKGROUND OF THE INVENTION

This invention relates to nuclear reactors particularly gas cooled nuclear reactors in which the core is made up of a plurality of fuel bearing components in the form of prismatic blocks. These blocks as proposed hitherto have been hexagonal or square in cross section a number of such blocks being assembled in juxtaposition, axes parallel, to make up a core.

The invention aims to provide a core configuration having a favorable fuel/moderator volume ratio and which will accommodate the usual control rod and fuel handling facilities. To ensure the correct disposition of the core comopnents the invention may be considered to be based on the following geometric concept. The whole or a substantial part of a representation of the core cross sectional area is inscribed with groups of similar touching circles (so caled base circles) there being four circles in each group arranged so that their centres are on a diamond-shaped lattice and the centres of the circles in one group so disposed relative to centres of the circles of neighbouring groups that the groups nest. A six-sided plane figure which circumscribes each group of circles then forms the cell. Such a figure will be defined by two of its pairs of opposite sides each being common equal tangents to adjacent base circles of each group and the remaining pair of opposite sides being respective tangents to the more remote circles which intercept the said common tangents. The mid points of the four common tangents will then define the centre portions for withdrawable inserts (i.e. control rods or handling gear). These centre positions then fall to lie on a square lattice pitch and can be selected to serve as control rod centres and standpipe centres alternately. Circles on these centres substantially of smaller radius than that of the base circles can be made to touch the base circles and will trespass into the area enclosed by the six-sided figure by as mall amount but nevertheless the remaining area of the six-sided figure gives the cross section of one block or a group of blocks from which the core is built up. It will be found convenient to sub-divide the figure into four irregular pentagons. Of course the division may be into other polygonal shapes but irregular pentagons formed by the common tangents to the base circles are preferred because these may be plane figures identical to one another in contour and enclose the base circles with very little of the enclosed area lying outside the base circles.

SUMMARY OF THE INVENTION

According to the invention there is provided a nuclear reactor core comprising a number of groups of nesting of similar columns incorporating nuclear fuel and moderating material with provision for cooling and each column arranged parallel to a common direction, each group of columns surrounding a channel extending parallel to said common direction for receiving a longitudinal core member of a cross-sectional area substantially equal to said channel and less than that of a column whose cross sectional area is such that the pitch of the channel is greater than that of the columns. In a further aspect the invention provides a nuclear reactor core composed of fuel bearing components in the form of prismoidal blocks of fuel bearing moderator material, each of similar irregular pentagonal cross section and each block having one pair, at least, of opposite corners relieved with a groove, said groove defining a quadrant of a hole formed by placing four such blocks in juxtaposition. The centres of such holes would then be on a square lattice and the centre of area of each pentagonal block would be substantially at the centre of a base circle.

BRIEF DESCRIPTION OF THE DRAWINGS

One embodiment of the invention will now be described by way of example with reference to the accompanying drawings in which:

FIG. 3 is a plan view of part of a nuclear reactor core made up from blocks shaped as shown in FIG. 2;

Figure 1:
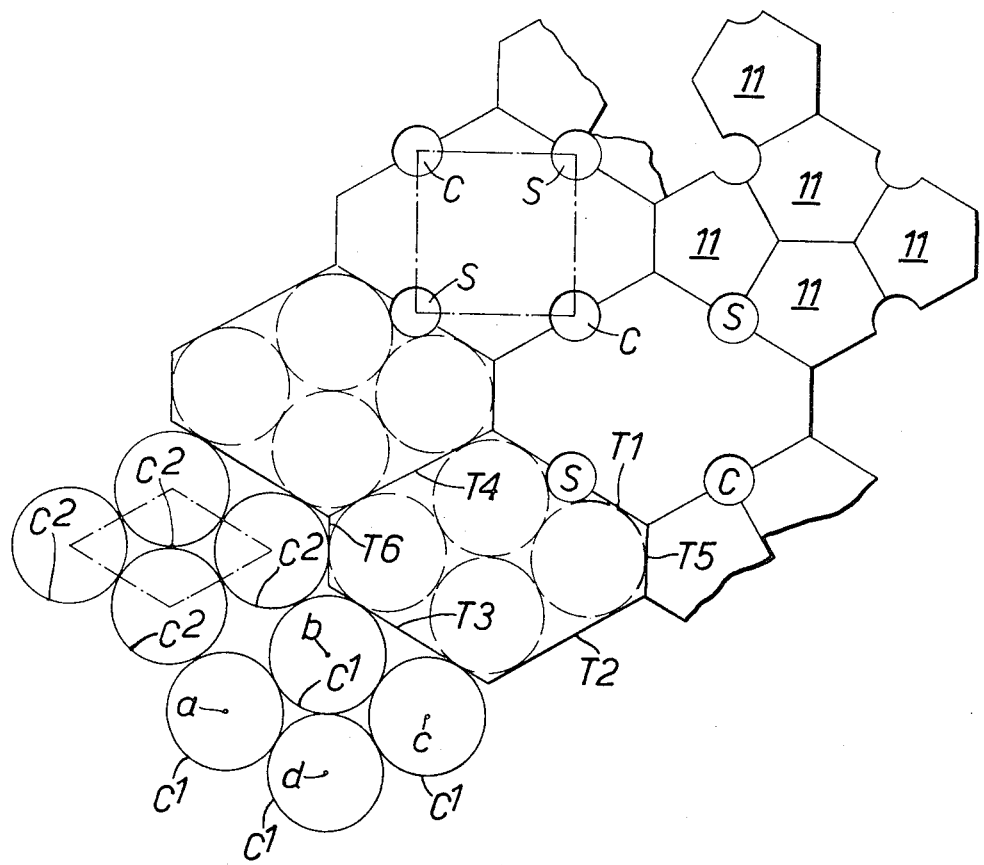
FIG. 1 is a diagram illustrating how the positions of realtive core cells are obtained.

Referring firstly to FIG. 1, $a$, $b$, $c$ and $d$ indicate the centre points on a diamond lattice of touching base circles C arranged so that each group of four base circles $C^1C^1C^1C^1$; $C^2C^2C^2C^2$, . . . nest. Each group of four circles are circumscribed by a six-sided plane figure defined by two pairs of equal opposite tangents T1, T2, T3, T4, each tangent being common to two adjacent circles, and the third pair of opposite sides being tangents T5, T6 to the more remote circles of the group. The resulting six-sided figure composed of sides T1 . . . T6 is the basic core cell. At the centre of each of the longer sides of the figure are pitched smaller diameter circles S and C and as shown these fall on a square lattice.

The area of the circles S and C overlap the area enclosed by the six-sided plane figure touching the base circles and the remaining area of the cell is the area or a multiple of the areas of core components necessary to make up the reactor core.

Conveniently said remaining area may be divided into four irregular figures substantially pentagonal in cross section but with a pair of opposite corners being cut away to form a groove shaped as a quadrant of one of the holes C or S. Blocks 11 of this cross section may be identical in shape.

Figure 2:
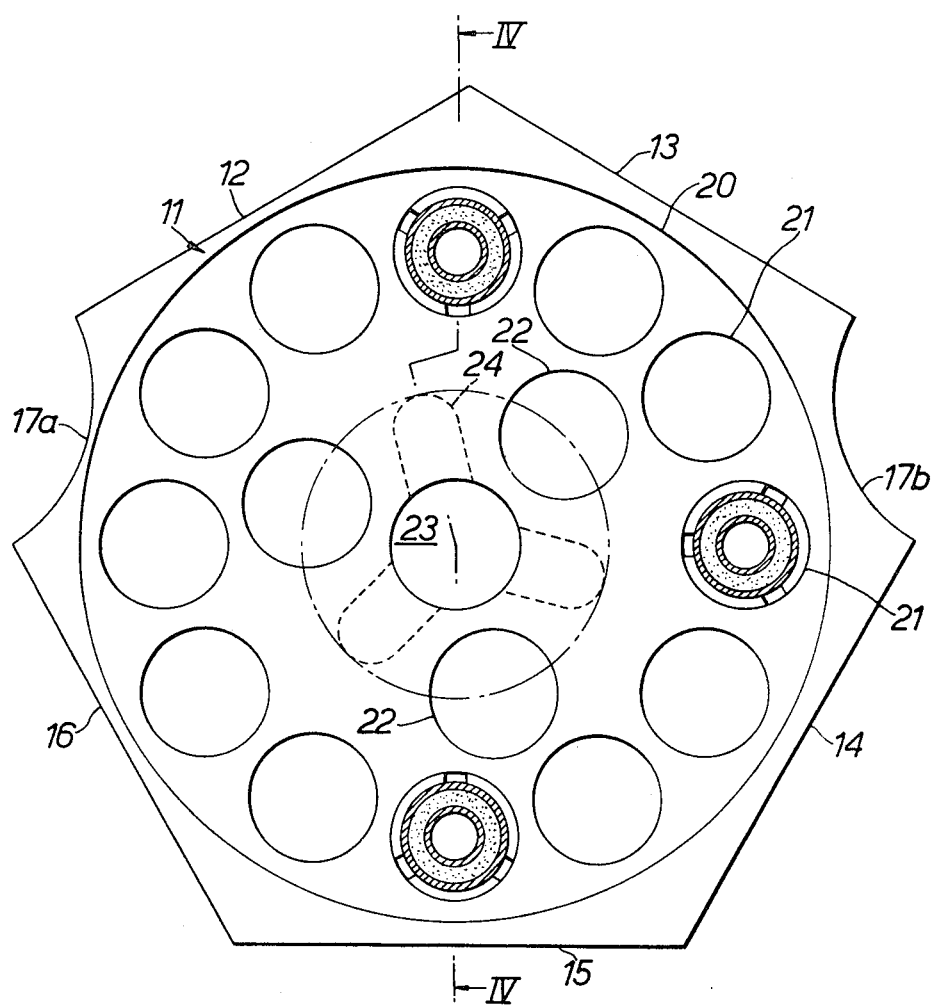
FIG. 2 is a cross section of prismoidal block taken in a plane at right angles to its columnar axis.

One such block is shown in FIG. 2. In this figure a block of moderator material such as graphite has an irregular pentagonal cross section having its five sides designated 12, 13, 14, 15 and 16. Adjacent sides 12, 16 lie in respective planes normal to one another as also do the opposite pair of adjacent sides 13, 14. The angles included by the other sides are each 120°. At the two corner positions between the two opposite pairs of adjacent sides 12, 16 and 13, 14, the edge of the block is relieved being cut away by arcuate grooves 17a, 17b, the surfaces of which form one quadrant of a circular section hole S, C when similar corners of four such blocks are placed in juxtaposition.

FIG. 3 shows just such an arrangement with a number of blocks 11 arranged in juxtaposition, axes parallel and with like sides adjacent to one another so that the grooves 17 in adjacent block co-operate to define circular section holes S, C running parallel to the axes of the blocks. As shown the shape of the blocks is such that each group of four blocks which co-operate to define any given circular hole lie on a square lattice.

Now the holes C, S are employed either to contain a nuclear control rod C or a so-called spreader rod. The function and construction of control rods are well known but the use of a spreader rod is thought to be novel in this context and needs some explanation. A spreader rod is a rod or tube of low neutron absorption cross section material of a diameter suited to fit the hole S, preferably with a lead-in taper at one end and perhaps a slight taper along its shank. In the cold condition, sufficient clearance must be left between the faces of adjacent blocks, to permit thermal expansion of the blocks to take place without building up excessive stresses. In operation, irradiation induced effects may cause distortion of the blocks, thus resulting in their becoming jammed and difficult to remove for refuelling purposes. It is therefore desirable to provide additional clearance between faces 12 and 16 of adjacent blocks, so as to facilitate withdrawal and replacement of blocks during refuelling. However, if additional looseness is present in the core throughout normal operation, it may permit increased distortion of the blocks, vibration or other undesirable effects. It is therefore a feature of the present invention that additional clearance to facilitate fuel handling is provided between faces 12 and 16 of adjacent blocks, but that relative movements due to this additional clearance are prevented by the presence of the spreader rod.

When refuelling is to be carried out, the spreader rod is first removed, thus creating sufficient looseness of the immediately adjacent blocks to facilitate their removal and replacement. After replacement of the adjacent blocks, the spreader rod (or a new one) is re-inserted to prevent undesirable effects due to the clearance between the adjacent blocks. Adjacent surfaces of the blocks may be provided with local longitudinal serrations to restrict movement of the block faces over one another.

From careful observation of FIG. 3 it will be seen that a degree of interlocking is achieved by virtue of the block shape which will mean that should one block be removed (after extraction of the spreader rod) the neighbouring block will not topple into the void so created.

As stated above the blocks are fuel bearing and one way of incorporating fuel into the blocks is shown in FIG. 2 the fuelled area being enveloped by a circle 20. The block is drilled with an outer annular row of holes 21 and three inner holes 22, within which prefabricated fuel compacts are supported in a manner which allows for the passage of coolant through the holes 21, 22 and over the fuel compacts.

A central hole 23 is drilled on the centre of circle 20 for entry and subsequent engagement by a gripper of a lifting machine. In the case of the block shown, three radial slots 24 are indicated extending from the bottom of the hole 23 at 120° intervals to allow the expandable fingers of a gripper to engage underside of the block one it had entered the hole 23. When the blocks are assembled as a core within a pressure vessel the introduction of fuel handling tools necessitates suitable penetrations in the pressure vessel wall.

For such access to the pressure vessel internals, a closable penetration is provided in the pressure vessel wall immediately adjacent to an end face of the core above each hole S, C. Alternate ones of these penetrations are for the introduction of spreader rods and for the manipulation of control rods in the underlying channels, those holes indicated by the letter S being for spreader rods and those designated C being for control rods. The charge and discharge of fuel blocks is accomplished by removing the penetration closure from the penetration above a spreader rod, removing the rod itself with a straight upward pull and introducing a cranked lifting tool through the penetration. The tool is then moved off centre until the gripper could enter the hole 23 in the block which it was required to be removed. Suitable latches of the gripper are then opened to enter into the radial slots 24. The block is then raised (there being sufficient headroom between the top of the core and the pressure vessel lid for this purpose), and the block swung below the penetration whence it is raised out of the pressure vessel.

Figure 4:
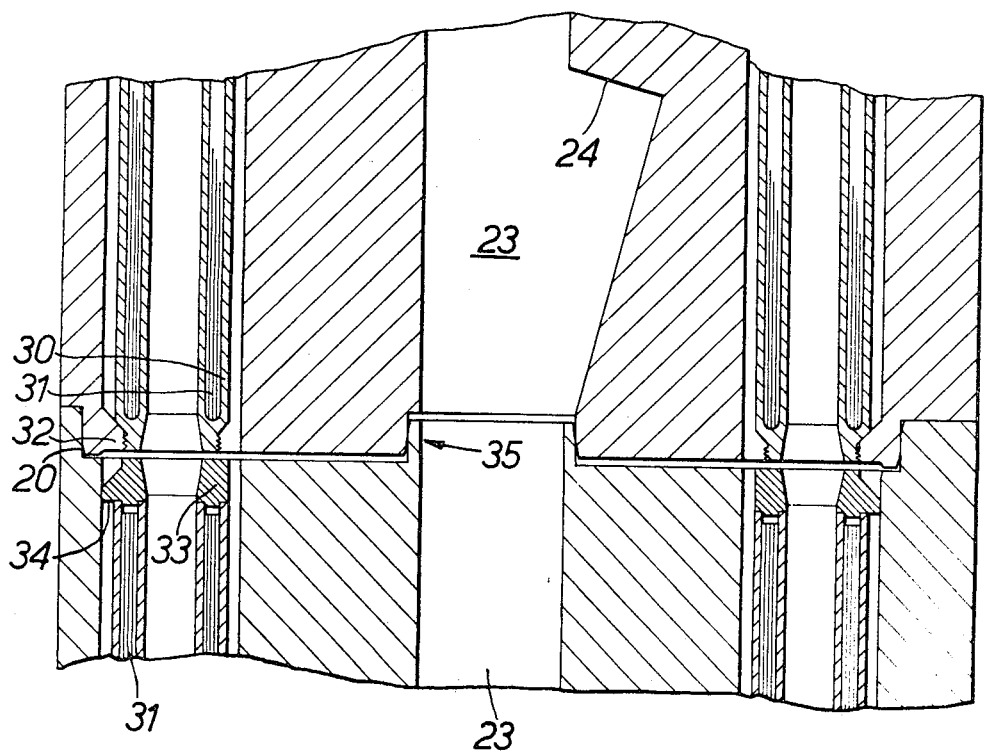
FIG. 4 is a scrap cross section on the line IV—IV of FIG. 2.

Of course it will in practice be preferable to employ a series of layers of blocks one upon the other and a suitable manner for blocks to sit one on the other is indicated in FIG. 4 which is a section on the line IV—IV of FIG. 2. As shown each fuel chanel constituted by holes 21, 22 receives a graphite tube 30 with an annular fuel filling 31 within its wall thickness. The base of the tube is screw-threaded to engage complementary screw-threads on the inner radius of three spaced fingers 32, which project inwardly from around the lower end of each of the holes 21, 22. At the upper end of the graphite tube 30 the fuel filling 31 is retained by a stopper 33. In addition to retaining the fuel filling the stopper 33 serves to centralize the top of the fuel tube in the hole 21, 22 and spaced projections 34 are provided to abut the wall of the hole for this purpose.

The actual blocks themselves spigot into one another at the circle 20 and at 35. At the lower end of the block the graphite between circles 20 and 35 is extended to define the male part of the spigot assembly while the similar graphite at the upper end of the block is relieved to define the female part of the assembly. The holes 23 in adjacent superimposed blocks register with one another by virtue of the concentric spigotting.

It will be seen that the spigotting arrangements effect a spacing of the horizontal faces of the superimposed graphite blocks to allow for distortion. The adjacent regions of the coolant channel are arranged with suitable faring so that there is a reduction in coolant velocity at these junction points. Consequently there is a reduction in velocity head of the coolant and associated losses will likewise be reduced.

We claim:

1. A gas cooled nuclear reactor having a core composed of a plurality of similar, replaceable, fuel-bearing blocks of moderator material, the blocks being substantially pentagonal in cross section and assembled in side by side adjacency with the sides of each block lying adjacent the sides of other blocks, each of said substantially pentagonal blocks having two of its five interior angles as right angles, each of said blocks including a longitudinal groove formed at the junction of the sides forming each of said right angles such that the grooves presented by four adjacent blocks forms a substantially closed channel, longitudinal members withdrawably inserted in said channels and bearing against block forming the channel so that on withdrawal of any one of said longitudinal members looseness is created between the sides of the four blocks whose grooves define that channel whereby removal and replacement of those blocks is facilitated while the remaining blocks are held in adjacency by other inserted longitudinal members.

2. A gas cooled nuclear reactor as claimed in claim 1 wherein said channels define a square lattice and wherein said reactor includes a pressure vessel wall including closeable penetration means in alignment with at least some of said channels.

3. A gas cooled nuclear reactor according to claim 2 wherein some of said channels contain withdrawable control rods.

References Cited

UNITED STATES PATENTS

| | | | |
|---|---|---|---|
| 2,985,575 | 5/1961 | Dennis et al. | 176—43 |
| 3,157,582 | 11/1964 | Babule et al. | 176—84 |
| 3,206,370 | 9/1965 | Campbell et al. | 176—58 X |
| 3,207,670 | 9/1965 | Fortescue et al. | 176—78 X |
| 3,218,237 | 11/1965 | Stoker et al. | 176—71 |
| 3,296,086 | 1/1967 | Boutin et al. | 176—84 |
| 3,366,546 | 1/1968 | Anthony et al. | 176—78 |
| 3,413,196 | 11/1968 | Fortescue et al. | 176—58 A |

FOREIGN PATENTS

| | | | |
|---|---|---|---|
| 1,261,104 | 4/1961 | France | 176—84 |

CARL D. QUARFORTH, Primary Examiner

R. S. GAITHER, Assistant Examiner

U.S. Cl. X.R.

176—71, 73, 75, 77, 84, 88